US012749287B1

(12) United States Patent
Leotescu et al.

(10) Patent No.: US 12,749,287 B1
(45) Date of Patent: Sep. 29, 2026

(54) MACHINE LEARNING SYSTEMS FOR GENERATING REPRESENTATIONS BASED ON MULTIPLE IMAGES OF AN OBJECT

(71) Applicant: AMAZON TECHNOLOGIES, INC., Seattle, WA (US)

(72) Inventors: George Leotescu, Bucharest (RO); Alin-Ionut Popa, Bucharest (RO); Daniel Voinea, Vladiceasca (RO); Mingwei Shen, Shoreline, WA (US); Pietro Perona, Altadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 18/740,256

(22) Filed: Jun. 11, 2024

(51) Int. Cl.
*G06V 10/774* (2022.01)
*G06V 10/74* (2022.01)

(52) U.S. Cl.
CPC .......... *G06V 10/761* (2022.01); *G06V 10/774* (2022.01)

(58) Field of Classification Search
None
See application file for complete search history.

(56) References Cited

U.S. PATENT DOCUMENTS

2024/0404144 A1* 12/2024 Aggarwal ................ G06N 3/08

OTHER PUBLICATIONS

Alayrac, et al., "Flamingo: a Visual Language Model for Few-Shot Learning", 36th Conference on Neural Information Processing Systems (NeurIPS 2022), Nov. 15, 2022, 54 pgs. Retrieved from the Internet: URL: https://arxiv.org/pdf/2204.14198.
Arandjelovic, et al., "Three Things Everyone should know to Improve Object Retrieval", 2012 IEEE Conference on Computer Vision and Pattern Recognition, Jun. 16-21, 2012, 39 pgs. Retrieved from the Internet: URL: hhttps://www.robots.ox.ac.uk/~vgg/publications/2012/Arandjelovic12/presentation.pdf.
Carion, et al., "End-to-End Object Detection with Transformers", Facebook AI, May 28, 2020, 26 pgs. Retrieved from the Internet: URL: https://arxiv.org/pdf/2005.12872.
Caron, et al., "Emerging Properties in Self-Supervised Vision Transformers", May 24, 2021, 21 pgs. Retrieved from the Internet: URL: https://arxiv.org/pdf/2104.14294.
Chen, et al., "A Simple Framework for Contrastive Learning of Visual Representations", Google Research, Jul. 1, 2020, 20 pgs. Retrieved from the Internet: URL: https://arxiv.org/pdf/2002.05709.

(Continued)

*Primary Examiner* — Idowu O Osifade
(74) *Attorney, Agent, or Firm* — Pierce Atwood LLP

(57) ABSTRACT

A single latent representation is generated based on multiple images of an item using an iterative process that sequentially updates the latent representation as each image is processed. A first image is encoded and used to initialize a first latent representation. A second image is encoded and a cross-attention operation is performed based on the first latent representation and the representation of the encoded second image. This process is repeated for each subsequent image. Once all images of the item have been processed in this manner, the final latent representation may represent characteristics common to the images of the item while de-prioritizing characteristics not common to the images. The single latent representation may then be used for subsequent image-based search operations.

20 Claims, 5 Drawing Sheets

(56) References Cited

OTHER PUBLICATIONS

Chen, et al., "CrossViT: Cross-Attention Multi-Scale Vision Transformer for Image Classification", MIT-IBM Watson AI Lab, Aug. 22, 2021, 12 pgs. Retrieved from the Internet: URL: https://arxiv.org/pdf/2103.14899.
Collins, et al., "ABO: Dataset and Benchmarks for Real-World 3D Object Understanding", 17pgs. Retrieved from the Internet: URL: https://arxiv.org/pdf/2110.06199.
Darcet, et al., "Vision Transformers Need Registers", Apr. 12, 2024, 21 pgs. Retrieved from the Internet: URL: https://arxiv.org/pdf/2309.16588.
Dosovitskiy, et al., "An Image is Worth 16×16 Words: Transformers for Image Recognition at Scale", Published as a conference paper at ICLR 2021, Jun. 3, 2021, 22 pgs. Retrieved from the Internet: URL: https://arxiv.org/pdf/2010.11929.
El Hajjar, et al., "Consensus graph and spectral representation for one-step multi-view kernel based clustering", Jan. 17, 2022, 11 pgs. Retrieved from the Internet: URL: https://addi.ehu.es/bitstream/handle/10810/56876/1-s2.0-S0950705122000764-main.pdf;jsessionid=A402CBF34F9911E950362CB67ECFFC16?sequence=1.
Germain, et al., "Visual correspondence hallucination", Published as a conference paper at ICLR 2022, Feb. 2, 2022, 28 pgs. Retrieved from the Internet: URL: https://arxiv.org/pdf/2106.09711.
Gordo, et al., "Deep Image Retrieval: Learning global representations for image search", Computer Vision Group, Xerox Research Center Europe, Jul. 28, 2016, 21 pgs. Retrieved from the Internet: URL: https://arxiv.org/pdf/1604.01325.
Grill, et al., "Bootstrap Your Own Latent A New Approach to Self-Supervised Learning", Sep. 10, 2020, 35 pgs. Retrieved from the Internet: URL: https://arxiv.org/pdf/2006.07733.
Han, et al., "Large-Scale Product Retrieval with Weakly Supervised Representation Learning", Aug. 1, 2022, 6 pgs. Retrieved from the Internet: URL: https://arxiv.org/pdf/2208.00955.
He, et al., "Deep Residual Learning for Image Recognition", Microsoft Research, Dec. 10, 2015, 12 pgs. Retrieved from the Internet: URL: https://arxiv.org/pdf/1512.03385.
He, et al., "Masked Autoencoders Are Scalable Vision Learners", Facebook AI Research (FAIR), Dec. 19, 2021, 14 pgs. Retrieved from the Internet: URL: https://arxiv.org/pdf/2111.06377.
Hochreiter, et al., "Long Short-Term Memory", Neural Computation, 1997, 46 pgs. Retrieved from the Internet: URL: https://deeplearning.cs.cmu.edu/F23/document/readings/LSTM.pdf.
Hollein, et al., "Text2Room: Extracting Textured 3D Meshes from 2D Text-to-Image Models", Sep. 10, 2023, 18 pgs. Retrieved from the Internet: URL: https://arxiv.org/pdf/2303.11989.
Hong, et al., "3D Concept Learning and Reasoning from Multi-View Images", Mar. 20, 2023, 24 pgs. Retrieved from the Internet: URL: https://arxiv.org/pdf/2303.11327.
Jiang, et al., "COTR: Correspondence Transformer for Matching Across Images", Aug. 17, 2021, 13 pgs. Retrieved from the Internet: URL: https://arxiv.org/pdf/2103.14167.
Johnson, et al., "Billion-scale similarity search with GPUs", Facebook AI Research, Feb. 28, 2017, 12 pgs. Retrieved from the Internet: URL: https://arxiv.org/pdf/1702.08734.
Kumar, et al., "Unsupervised multi-modal representation learning for high quality retrieval of similar products at e-commerce scale", Proceedings of the 32nd ACM International Conference on Information and Knowledge Management (CIKM '23), Amazon, Oct. 21-25, 2023, 7 pgs. Retrieved from the Internet: URL: https://dl.acm.org/doi/pdf/10.1145/3583780.3615504.
Lee, et al., "Stacked cross attention for image-text matching", Jul. 23, 2018, 25 pgs. Retrieved from the Internet: URL: https://arxiv.org/pdf/1803.08024.
Li, et al., "Consensus graph learning for multi-view clustering", IEE Transactions on Multimedia, vol. 24, May 20, 2021, 4 pgs. Retrieved from the Internet: URL: https://ieeexplore.ieee.org/document/9437715.
Lin, et al., "COMPLETER: Incomplete Multi-view Clustering via Contrastive Prediction", CVPR 2021, 10 pgs. Retrieved from the Internet: URL: https://openaccess.thecvf.com/content/CVPR2021/papers/Lin_COMPLETER_Incomplete_Multi-View_Clustering_via_Contrastive_Prediction_CVPR_2021_paper.pdf.
Lin, et al., "Dual contrastive prediction for incomplete multi-view representation learning", IEEE Transactions on Pattern Analysis and Machine Intelligence, 18 pgs. Retrieved from the Internet: URL: https://pengxi.me/wp-content/uploads/2023/02/DCP-2023_compressed.pdf.
Liu, et al., "MeshDiffusion: Score-based generative 3D mesh modeling", ICLR 2023, Apr. 15, 2023, 26 pgs. Retrieved from the Internet: URL: https://arxiv.org/pdf/2303.08133.
Liu, et al., "Multiview subspace clustering via co-training robust data representation", IEEE Transactions on Neural Networks and Learning Systems, Mar. 2021, 14 pgs. Retrieved from the Internet: URL: https://www.researchgate.net/profile/Jiyuan-Liu-4/publication/350399761_Multiview_Subspace_Clustering_via_Co-Training_Robust_Data_Representation/links/607131d392851c8a7bb71813/Multiview-Subspace-Clustering-via-Co-Training-Robust-Data-Representation.pdf.
Loper, et al., "SMPL: A Skinned Multi-Person Linear Model", Aug. 1, 2023, 16 pgs. Retrieved from the Internet: URL: https://files.is.tue.mpg.de/black/papers/SMPL2015.pdf.
Lu, et al., "Bidirectional attentive multi-view clustering", IEEE, vol. 36, Issue 5, May 2024, 4 pgs. Retrieved from the Internet: URL: https://ieeexplore.ieee.org/abstract/document/10243106.
Luo, et al., "Diffusion probabilistic models for 3D point cloud generation", Wangxuan Institute of Computer Technology, Peking University, Jun. 13, 2021, 9 pgs. Retrieved from the Internet: URL: https://arxiv.org/pdf/2103.01458.
Muhamed, et al., "Web-scale semantic product search with large language models", Amazon, 2023, 12 pgs. Retrieved from the Internet: URL: https://assets.amazon.science/cd/8e/d89d10a142ada7e5d60833e4e574/web-scale-semantic-product-search-with-large-language-models.pdf.
Oquab, et al., "DINOv2: Learning Robust Visual Features without Supervision", Meta AI Research, Feb. 2, 2024, 32 pgs. Retrieved from the Internet: URL: https://arxiv.org/pdf/2304.07193.
Raj, et al., "Dreambooth3D: Subject-Driven Text-to-3D Generation", Google, Mar. 27, 2023, 13 pgs. Retrieved from the Internet: URL: https://arxiv.org/pdf/2303.13508.
Sarlin, et al., "SuperGlue: Learning Feature Matching with Graph Neural Networks", Mar. 28, 2020, 8 pgs. Retrieved from the Internet: URL: https://arxiv.org/pdf/1911.11763.
Shi, et al., "3D-RETR: End-to-End Single and Multi-View3D Reconstruction with Transformers", Nov. 16, 2021, 18 pgs. Retrieved from the Internet: URL: https://arxiv.org/pdf/2110.08861.
Singh, et al., "The effectiveness of MAE pre-pretraining for billion-scale pretraining", Meta AI, Jan. 25, 2024, 17 pgs. Retrieved from the Internet: URL: https://arxiv.org/pdf/2303.13496.
Stoian, et al., "Unstructured object matching using co-salient region segmentation", CVPR, Amazon, Romania, Jun. 2022, 10 pgs. Retrieved from the Internet: URL: https://openaccess.thecvf.com/content/CVPR2022W/IMW/papers/Stoian_Unstructured_Object_Matching_Using_Co-Salient_Region_Segmentation_CVPRW_2022_paper.pdf.
Sun, et al., "EVA-CLIP: Improved Training Techniques for CLIP at Scale", Mar. 27, 2023, 7 pgs. Retrieved from the Internet: URL: https://arxiv.org/pdf/2303.15389.
Sun, et al., "LoFTR: Detector-free local feature matching with transformers", Apr. 1, 2021, 10 pgs. Retrieved from the Internet: URL: https://arxiv.org/pdf/2104.00680.
Szegedy, et al., "Inception-v4, Inception-ResNet and the Impact of Residual Connections on Learning", Google, Inc., Aug. 23, 2016, 12 pgs. Retrieved from the Internet: URL: https://arxiv.org/pdf/1602.07261.
Trosten, et al., "On the Effects of Self-supervision and Contrastive Alignment in Deep Multi-view Clustering", Department of Physics and Technology, UiT The Arctic University of Norway, Mar. 17, 2023, 17 pgs. Retrieved from the Internet: URL: https://arxiv.org/pdf/2303.09877.

(56) References Cited

OTHER PUBLICATIONS

Tsai, et al., "Self-supervised learning from a multi-view perspective", Published as a conference paper at ICLR 2021, Mar. 22, 2021, 18 pgs. Retrieved from the Internet: URL: https://arxiv.org/pdf/2006.05576.
Van Der Maaten, et al., "Visualizing Data using t-SNE", 2008, 27 pgs. Retrieved from the Internet: URL: https://www.jmlr.org/papers/volume9/vandermaaten08a/vandermaaten08a.pdf.
Van Horn, et al., "The iNaturalist Species Classification and Detection Dataset", CVPR, Apr. 10, 2018, 10 pgs. Retrieved from the Internet: URL: https://arxiv.org/pdf/1707.06642.
Vaswani, et al., "Attention Is All You Need", 31st Conference on Neural Information Processing Systems (NIPS 2017), 2017, 11 pgs. Retrieved from the Internet: URL: https://arxiv.org/pdf/1706.03762.
Wang, et al., "Disentangling Light Fields for Super-Resolution and Disparity Estimation", Jul. 22, 2023, 19 pgs. Retrieved from the Internet: URL: https://arxiv.org/pdf/2202.10603.
Wang, et al., "MetaViewer: Towards A Unified Multi-View Representation", Shandong University, Mar. 11, 2023, 10 pgs. Retrieved from the Internet: URL: https://arxiv.org/pdf/2303.06329.
Wang, et al., "Occlusion-Aware Cost Constructor for Light Field Depth Estimation", National University of Defense Technology, Mar. 3, 2022, 10 pgs. Retrieved from the Internet: URL: https://arxiv.org/pdf/2203.01576.
Wang, et al., "V2L: Leveraging Vision and Vision-language Models into Large-scale Product Retrieval", Jul. 26, 2022, 5 pgs. Retrieved from the Internet: URL: https://arxiv.org/pdf/2207.12994.
Wiles, et al., "Co-Attention for Conditioned Image Matching", Mar. 26, 2021, 24 pgs. Retrieved from the Internet: URL: https://arxiv.org/pdf/2007.08480.
Wu, et al., "Multiview Compressive Coding for 3D Reconstruction", FAIR, Meta AI, Jan. 19, 2023, 12 pgs. Retrieved from the Internet: URL: https://arxiv.org/pdf/2301.08247.
Xie, et al., "Pixel-Aligned Recurrent Queries for Multi-View 3D Object Detection", Oct. 2, 2023, 11 pgs. Retrieved from the Internet: URL: https://arxiv.org/pdf/2310.01401.
Xu, et al., "GHUM & GHUML: Generative 3D Human Shape and Articulated Pose Models", CVPR 2020, 2020, 10 pgs. Retrieved from the Internet: URL: https://openaccess.thecvf.com/content_CVPR_2020/papers/Xu_GHUM_GHUML_Generative_3D_Human_Shape_and_Articulated_Pose_CVPR_2020_paper.pdf.
Xu, et al., "Multi-VAE: Learning Disentangled View-common and View-peculiar Visual Representations for Multi-view Clustering", ICCV, 2021, 10 pgs. Retrieved from the Internet: URL: https://openaccess.thecvf.com/content/ICCV2021/papers/Xu_Multi-VAE_Learning_Disentangled_View-Common_and_View-Peculiar_Visual_Representations_for_Multi-View_ICCV_2021_paper.pdf.
Yan, et al., "GCFAgg: Global and Cross-view Feature Aggregation for Multi-view Clustering", May 11, 2023, 10 pgs. Retrieved from the Internet: URL: https://arxiv.org/pdf/2305.06799.
Yang, et al., "PointFlow: 3D Point Cloud Generation with Continuous Normalizing Flows", Sep. 2, 2019, 15 pgs. Retrieved from the Internet: URL: https://arxiv.org/pdf/1906.12320.
Yuan, et al., "eProduct: A Million-Scale Visual Search Benchmark to Address Product Recognition Challenges", eBay, Inc., Jul. 13, 2021, 5 pgs. Retrieved from the Internet: URL: https://arxiv.org/pdf/2107.05856.
Zheng, et al., "SIFT Meets CNN: A Decade Survey of Instance Retrieval", IEEE, May 23, 2017, 20 pgs. Retrieved from the Internet: URL: https://arxiv.org/pdf/1608.01807.
Zhou, et al., "Patch2Pix: Epipolar-Guided Pixel-Level Correspondences", Mar. 26, 2021, 17 pgs. Retrieved from the Internet: URL: https://arxiv.org/pdf/2012.01909.
Zuffi, et al., "3D Menagerie: Modeling the 3D Shape and Pose of Animals", Apr. 12, 2017, 9 pgs. Retrieved from the Internet: URL: https://arxiv.org/abs/1611.07700.

* cited by examiner

MACHINE LEARNING SYSTEMS FOR GENERATING REPRESENTATIONS BASED ON MULTIPLE IMAGES OF AN OBJECT

BACKGROUND

Items available for purchase, or other types of objects, may be depicted using multiple images. For example, different images may depict different views of the item, the item being used for various purposes, the item in various locations, and so forth. A machine learning model may be used to generate a representation of an image, the representation of the image being usable for future search operations, such as when attempting to locate items having characteristics similar to an input image. However, generation and storage of a single representation for each image may utilize significant computational and data storage resources, as well as requiring significant computational resources when performing search operations or other tasks using the stored data.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
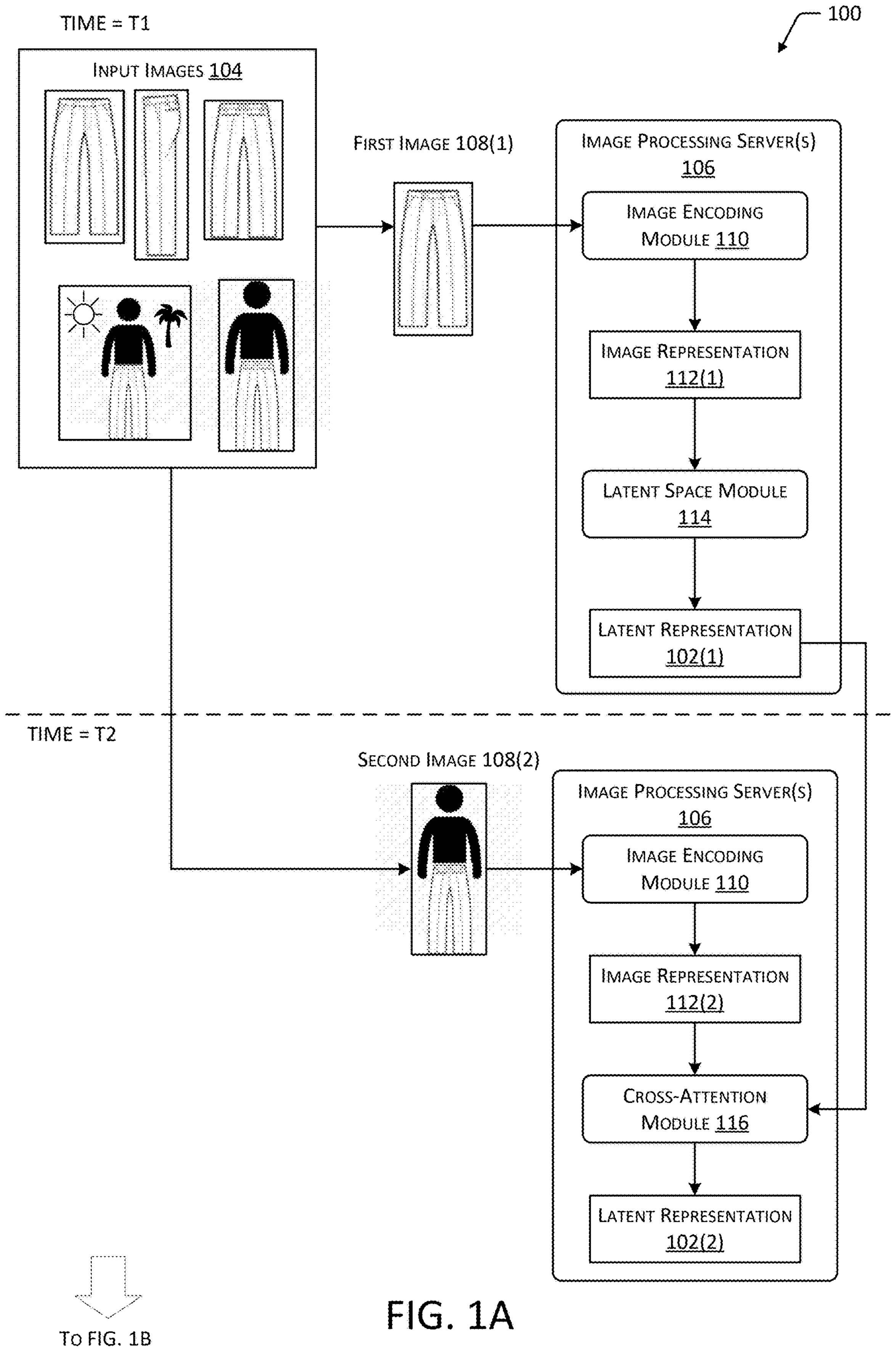
FIGS. 1A and 1B are a diagram depicting an implementation of a system for generating a latent representation of an item based on multiple input images that depict the item.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Various types of applications, such as object retrieval or image search applications, may be used to determine one or more images that correspond to a query. For example, a set of images may depict items available for purchase using an online store. In some cases, an item may be represented by a single image, while in other cases, multiple images may be used to depict an item. For example, multiple images may represent different views of an item, or may depict the item being used for different purposes or in different locations. To enable images to be searched, each image may be encoded using an image encoder to determine an image representation. For example, an image representation may include a vector embedding having values that correspond to various dimensions, each dimension of the vector and its corresponding value representing a characteristic of one or more pixels of the associated image. In cases where a large number of images are used to represent a large number of items, generation of a single representation for each image may utilize a significant amount of data storage and computational resources. In some cases, a query to search for a particular item or an item having certain characteristics may include an image of the item, which may be encoded to determine a representation. To determine items that correspond to the search query, the representation determined based on the query image may be compared to the representations for each image to determine the images associated with representations that are similar to that of the query image. A comparison process in which a representation of a query image is compared to many individual representations of images that depict items may utilize a significant quantity of time and computational resources.

Described in this disclosure are techniques for determining a single machine-readable representation for an item or other type of object, such as a latent representation, based on multiple images of the item or object. For example, a particular item may be depicted in multiple images. Each image may depict a different view of the item or display the item in a particular use or location. In such a case, each image may depict different characteristics of the item, and in some cases may depict background elements or other objects. To generate a single representation based on multiple images, a sequential latent space modeling flow may be used to sequentially process each of the multiple images, using a cross-attention operation to cause characteristics that are common to multiple images, which have a greater probability of being associated with the depicted item, to be associated with greater weight in the final representation than other characteristics that are not common to many of the images, which have a greater probability of representing background elements or other objects. As a result, each successive image used to determine the resulting latent representation may improve the accuracy of the representation with regard to the item being represented, such that a latent representation based on a large number of images may strongly correspond to the features of the represented item.

For example, a set of images may depict an item. Each image may depict a different view of the item, or may depict the item being used for different purposes, in different locations, and so forth. For example, in each image, one or more characteristics of the item may be visible, other characteristics of the item may not be visible, and in some cases, an image may also depict one or more other elements, such as background elements, other objects, and so forth. A first image of the set of images may be encoded using an image encoder to determine a first image representation. In some implementations, the first image representation may include a vector embedding. For example, a vector embedding may include a series of values, each value corresponding to a dimension of a vector, each dimension representing a characteristic of one or more pixels of the first image. An initial latent representation may be determined based on the first image representation, such as by projecting a vector embedding or other type of image representation into a latent space having dimensions that correspond to those of the first image representation. Use of an image that depicts the item to determine the initial latent representation may improve the accuracy of the final latent representation with regard to the features of the depicted item, relative to using an initial latent representation that includes noise or other random or pseudo-random values. A second image of the set of images may be encoded using the image encoder to determine a second image representation. For example, the second image representation may include a vector embedding having dimensions that correspond to those of the first image representation. A cross-attention operation may be used to determine a subsequent latent representation based on the initial latent representation, the second image representation, and a learnable weight parameter. This process may be repeated for each image in the set of images, with each image being encoded, and the cross-attention operation being used to determine a subsequent latent representation based on a current latent representation, the representation of the current image that was encoded, and the weight parameter. For each use of the cross-attention operation, the weight parameter may affect the weight associated with the current latent representation and the weight associated with the representation of the most recent image that was encoded.

Each successive image that is used to further modify the latent representation may improve the accuracy of the latent representation with regard to the features of the item depicted in each of the images. For example, the cross-attention operation may cause characteristics that are common to multiple images in the set of images to have a greater weight in the final latent representation than weights associated with other characteristics in the images. Continuing the example, the final latent representation may associate a greater weight with characteristics of the item that are visible in multiple images, while associating a lesser weight or a null weight with characteristics of images that are not common to multiple images, such as background elements or other objects. As a result, the final latent representation may constitute a representation of the characteristics of the item that may be determined based on the set of images of the item, rather than a representation of the images.

For example, for a given set of images (i=0 . . . N) that depict an item, the embedding of each image ($I_i$, for which $I_i \in R^{h \times w \times 3}$) may be sequentially processed to obtain a final latent representation ($L \in R^d$), which may represent characteristics of the item depicted across the set of images. To determine the final latent representation, multiple states of the latent representation (L) may be sequentially determined as each image of the set of images is processed. For example, the image representation for each image (I) may be processed using an image encoding backbone ($\varnothing^{BKB}$: $R^{h \times w \times 3} \rightarrow R^d$). The initial latent representation may be determined using the embedding of the first image ($L_0 = \varnothing^{BKB}(I_0)$). Then, a cross-attention operation ($\varnothing^{CROSS}$) may be used to determine a subsequent latent representation ($L_1$) based on the initial latent representation ($L_0$) and an embedding for a subsequent image ($\varnothing^{BKB}(I_1)$). For example, the output of $\varnothing^{BKB}(I_1)$ may be used as the keys and values for the cross-attention operation, while the initial latent representation ($L_0$) is used as the queries of the cross-attention operation. As described previously, a learnable weight parameter ($\sigma'$) may control the weight associated with the embedding for the subsequent image and the initial latent representation when determining the subsequent latent representation. This process may be repeated for each image in the set of images (I=0 . . . N) until a final latent representation ($L_N$) is determined, as indicated in Equation 1 below.

EQUATION 1

$$L_i = \begin{cases} (1-\sigma)\cdot\phi^{CROSS}\left(\phi^{BKB}(I_i), \phi^{BKB}(I_0)\right) + \sigma\cdot\phi^{BKB}(I_0), & \text{for } i = 1 \\ (1-\sigma)\cdot\phi^{CROSS}\left(\phi^{BKB}(I_i), L_{i-1}\right) + \sigma\cdot L_{i-1}, & \text{for } i > 1 \end{cases}$$

The cross-attention operation that uses the output of $\varnothing^{BKB}$ as keys (k(Y)) and values (v(X)), and the latent representation as queries (q(X)), may be determined based on Equation 2 below, in which d represents the variance of the dot product between the two representations.

EQUATION 2

$$\phi^{CROSS}(x, y) = \text{softmax}\left(\frac{q(X)k(Y)^T}{\sqrt{d}}\right)v(X)$$

The determined latent representation may be used for subsequent search or retrieval operations. For example, an input image may be received as a search query or for another type of operation. The input image may be encoded to determine a representation of the image. Correspondence between the representation of the input image and the final latent representation associated with an item may indicate that the input image includes characteristics of the item. By generating the latent representation based on multiple images of an item, a single latent representation may be used that represents characteristics of the item itself (determined based on a set of images that depict the item), rather than characteristics of a particular image. Then, in subsequent tasks, an input image or a set of input images may be compared to a single latent representation in a single operation, rather than individually comparing the representation of the input image to many individual representations of individual images of an item. Therefore, the single latent representation may be stored and used in subsequent operations using a smaller amount of computational resources than individual representations of individual images of items. In some implementations, if a set of input images is received, such as multiple images associated with a search operation, the process described above may be performed to determine a single latent representation based on the input images, and correspondence between this single latent representation and the stored latent representations for other sets of images may be used to determine an output.

In some implementations, the parameters of the image encoding backbone ($\varnothing^{BKB}$), the cross-attention operation ($\varnothing^{CROSS}$), and the weight parameter ($\sigma$) may be determined using a training process based on two machine learning models, which may colloquially be referred to as a "teacher" and "student" model. A set of training images that depict an item or other object may be used to generate two sets of cropped images, a first set (e.g., "global crops") that are cropped to provide the images with a first dimension, and a second set (e.g., "local crops") that are cropped to provide the images with a second dimension less than the first dimension. The first set of images may be used as inputs to the first machine learning model (($M_T$), e.g., the "teacher" model), and both the first set and the second set may be used as inputs to the second machine learning model (($M_S$), e.g., the "student" model). The first machine learning model may determine a first set of probabilities based on the first set of images, while the second machine learning model may determine a second set of probabilities based on the first and second sets of images. In some implementations, the outputs of both models may be normalized to produce two probability maps ( $$\Omega_T^{SSL}$$

for the first (e.g., "teacher") model, and $$(\Omega_S^{SSL})$$

for the second (e.g., "student")) model, as indicated in Equation 3 below, in which T represents a temperature parameter controlling the sharpness of the resulting probability.

$$\Omega^{SSL(L^T,i)} = \frac{e^{\phi^{SSL}(L^T)\frac{(i)}{T}}}{\sum_{j=1}^{d} e^{\phi^{SSL}(L^T)\frac{(j)}{T}}} \quad \text{EQUATION 3}$$

The second model may be optimized using a gradient backpropagation process by minimizing a function for cross-entropy loss ($L_{SSLCE}$) as indicated in Equation 4 below.

$$\mathcal{L}_{SSLCE} = \min_{\phi_S^{SSL} \circ M_S} -\Omega_s^{SSL} \log \Omega_T^{SSL} \quad \text{EQUATION 4}$$

Use of two machine learning models in this context, with the first model processing a first set of images having a larger dimension (e.g., global crops) and the second model processing the first set of images and a second set of images having a smaller dimension (e.g., local crops) may cause the models to determine local-to-global correspondences, thus highlighting discriminative aspects of the object across the multiple images. Use of the loss equation described above may cause the second model to approach an optimal configuration (e.g., set of weights or other values) via stochastic gradient descent. Weights or other values associated with the first model may be updated during the training process using an exponential moving average over the weights of the second model following a momentum encoder (λ) based on a cosine scheduler, as indicated in Equation 5 below.

$$\phi_T^{SSL} \circ M_T = \lambda(\phi_T^{SSL} \circ M_T) + (1 - \lambda)(\phi_S^{SSL} \circ M_S) \quad \text{EQUATION 5}$$

Using the learning paradigm illustrated in Equation 4 and Equation 5, the first machine learning model may stabilize and guide the second machine learning model toward an optimal exploration through an embedding as the training process progresses. In some implementations, this process may be facilitated by randomly sampling different crops of the set of images with each iteration of the training process. The parameters of the trained first machine learning model (e.g., the "teacher" model) may then be used to determine the parameters of the image encoding backbone and cross-attention operation.

Implementations described herein may therefore enable a single latent representation to be determined based on multiple images of an object. The multiple images may include different views of the object, the object being used for different purposes, the object in different locations and orientations, and so forth. Use of the trained cross-attention operation described above may cause the determined latent representation to more heavily prioritize features that are common among the images, which have a high probability of being features of the depicted object, while de-prioritizing features that are not common among the images, which have a high probability of being background elements or other objects. As a result, the determined latent representation may represent a combination of features of the object that may not necessarily appear in a particular image of the set, but that are included in the actual object, enabling the latent representation to function as a representation of the object itself rather than a representation of the images. The latent representation may be stored using less data storage than a large set of representations that each correspond to an individual image, and may be used in search operations or other operations using less computational resources than operations that access a large number of representations that correspond to individual images.

Figure 1B:
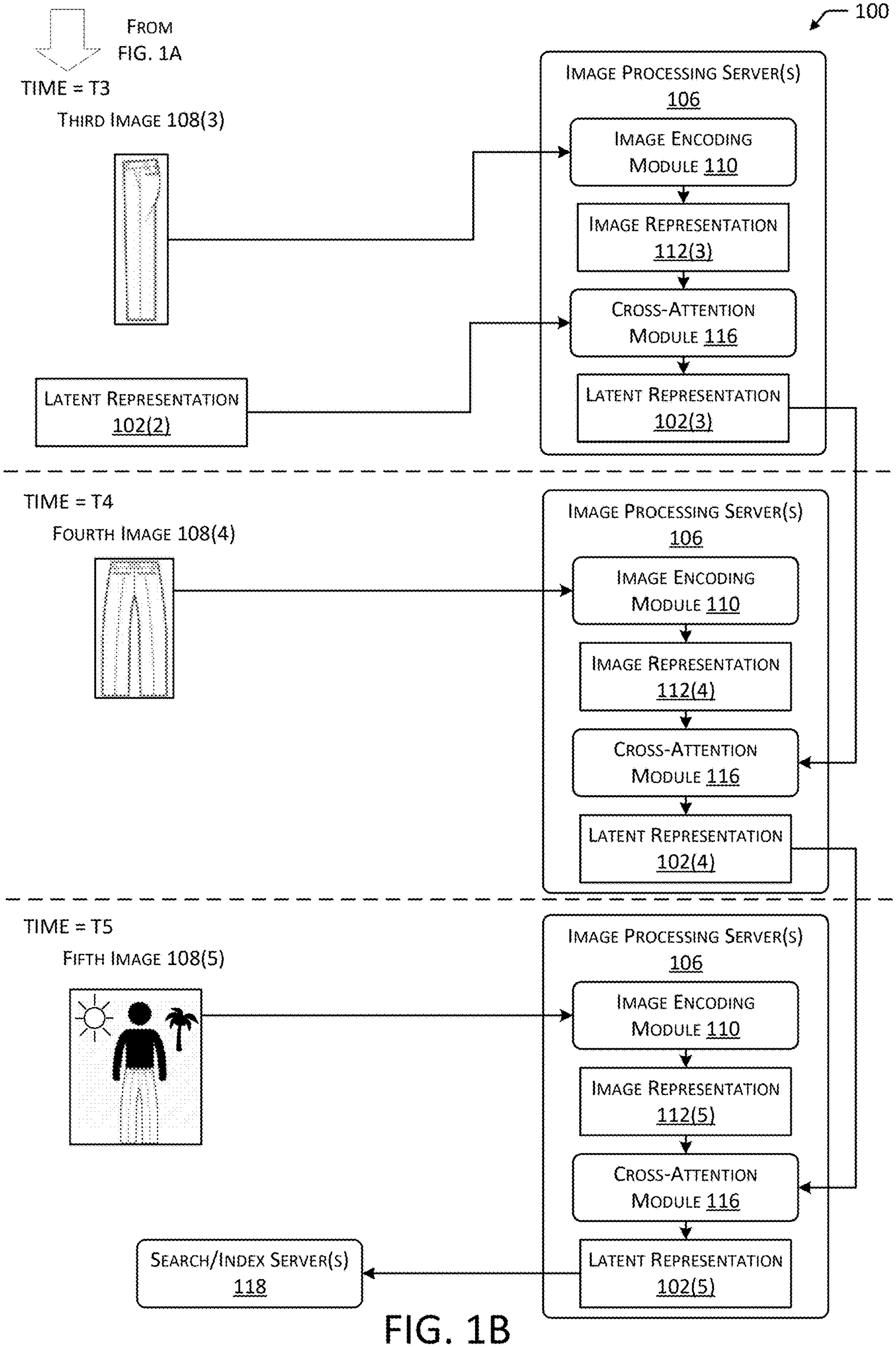

FIGS. 1A and 1B are a diagram 100 depicting an implementation of a system for generating a latent representation 102 of an item based on multiple input images 104 that depict the item. For example, the input images 104 may include image data representing images that depict a particular item in various locations, used for various purposes, various views of the item, and so forth. As such, while each input image 104 may depict at least a portion of the item, in some cases, one or more portions of the item may not be visible in one or more portions of an input image 104, and in some cases, one or more background elements or other objects may be included in an input image 104. For example, FIG. 1A depicts the input images 104 including an article of clothing, however a subset of the input images 104 depict the article of clothing being worn and therefore also depict a human, one or more background elements, and so forth.

To determine a latent representation 102 based on the input images 104, the input images 104 may be provided to one or more image processing servers 106. For example, one or more other computing devices may acquire the input images 104 and provide the input images 104 to the image processing server(s) 106. In other implementations, the input images 104 may be acquired or generated using the image processing server(s) 106 and use of one or more other computing devices may be omitted. In still other implementations, a combination of the image processing server(s) 106 and one or more other computing devices may be used to acquire the input images 104. While FIGS. 1A and 1B depict the image processing server(s) 106 as a server, the image processing server(s) 106 may include any number and any type of computing devices including, without limitation, personal computing devices, portable computing devices, wearable computing devices, vehicle-based computing devices, servers, media devices, network-accessible storage devices, and so forth.

At a first time T1, a first image 108(1) of the input images 104 may be provided to an image encoding module 110 associated with the image processing server(s) 106. The image encoding module 110 may determine an image representation 112(1) based on the first image 108(1). For example, the image encoding module 110 may include one or more image encoders that are configured to generate a vector embedding or other type of image representation 112(1) based on characteristics of at least a portion of the first image 108(1). Continuing the example, a vector embedding may include a series of values, each value associated with a dimension of the embedding, each dimension corresponding to a characteristic of at least a portion of the first image 108(1). A latent space module 114 associated with the image processing server(s) 106 may determine a first latent representation 102(1) based on the first image representation 112(1). For example, the latent space module 114 may project the first image representation 112(1) into a latent space having dimensions corresponding to those of the first image representation 112(1), or another selected set of dimensions. For example, as described previously, the first image representation 112(1) for the first image 108(1) may be processed using an image encoding backbone ($\o^{BKB}$: $R^{h \times w \times 3} \rightarrow R^{d}$).

At a second time T2 after the first time T1, the image encoding module 110 may determine a second image representation 112(2) based on the second image 108(2) of the set of input images 104. The second image 108(2) may depict the same item as the first image 108(1), but may include one or more different portions of the item, exclude one or more portions of the item that are visible in the first image 108(1), may include one or more other objects or background elements, may exclude one or more other elements visible in the first image 108(1), and so forth. As such, the second image representation 112(2) may represent one or more features that are also represented in the first image representation 112(1) if the features are common to the first image 108(1) and the second image 108(2), but may also represent various features that are not represented in the first image representation 112(1).

A cross-attention module 116 associated with the image processing server(s) 106 may perform a cross-attention operation based on the second image representation 112(2) and the first latent representation 102(1). For example, as described previously with regard to Equation 1 and Equation 2, the second image representation 112(2), or in some cases the output of an image encoding backbone based on the second image representation 112(2), may be used as the keys and values for the cross-attention operation, while the first latent representation 102(1) is used as the queries of the cross-attention operation. In some implementations, as described with regard to Equation 1, a learnable weight parameter may control the weight associated with the second image representation 112(2) and the weight associated with the first latent representation 102(1) when performing the cross-attention operation. Based on the cross-attention operation, the weight parameter, the second image representation 112(2), and the first latent representation 102(1), the cross-attention module 116 may determine a second latent representation 102(2) that may represent features of both the first image 108(1) and the second image 108(2). The cross-attention operation may cause features that are common to both the first image representation 112(1) and the second image representation 112(2) to be weighted more heavily, while features that are not common to the images to be weighed less heavily.

As shown in FIG. 1B, the process described at the second time T2 in FIG. 1A may be sequentially repeated for each subsequent image in the set of input images 104. At a third time T3 after the second time T2, the image encoding module 110 may determine a third image representation 112(3) based on the third image 108(3) of the set of input images 104. The third image 108(3) may depict the same item as the other input images 104, but may include one or more different portions of the item, may exclude one or more portions of the item that are visible in one or more other input images 104, may include one or more other objects or background elements, may exclude one or more other elements visible in one or more other input images 104, and so forth. The third image representation 112(3) may therefore represent one or more features that are also represented in other image representations 112 if the features are common to other input images 104, but may also represent various features that are not represented in the other image representations 112.

The cross-attention module 116 may determine a third latent representation 102(3) based on the cross-attention operation, the weight parameter, the third image representation 112(3), and the second latent representation 102(2). For example the third image representation 112(3), or in some cases the output of an image encoding backbone based on the third image representation 112(3), may be used as the keys and values for the cross-attention operation, while the second latent representation 102(2) is used as the queries of the cross-attention operation. In some implementations, the weight parameter may control the weights associated with the third image representation 112(3) and the second latent representation 102(2) that are associated with the cross-attention operation. The cross-attention operation may cause features that are common to multiple image representations 112 of the first image representation 112(1), the second image representation 112(2), and the third image representation 112(3), to be weighted more heavily than features that are not common to multiple image representations 112.

At a fourth time T4 after the third time T3, the image encoding module 110 may determine a fourth image representation 112(4) based on the fourth image 108(4) of the set of input images 104. The fourth image 108(4) may depict the same item as the other input images 104, but may include or exclude different portions of the item than other input images 104, include or exclude one or more other objects or background elements than other input images 104, and so forth.

The cross-attention module 116 may determine a fourth latent representation 102(4) based on the cross-attention operation, the weight parameter, the fourth image representation 112(4), and the third latent representation 102(3). For example the fourth image representation 112(4), or in some cases the output of an image encoding backbone based on the fourth image representation 112(4), may be used as the keys and values for the cross-attention operation, while the third latent representation 102(3) is used as the queries of the cross-attention operation. In some implementations, the weight parameter may control the weights associated with the fourth image representation 112(4) and the third latent representation 102(3) when performing the cross-attention operation. The cross-attention operation may cause features that are common to multiple image representations 112 to be weighted more heavily than features that are not common to multiple image representations 112.

At a fifth time T5 after the fourth time T4, the image encoding module 110 may determine a fifth image representation 112(5) based on a fifth image 108(5) of the set of input images 104. The fifth image 108(5) may depict the same item as the other input images 104, but may include or exclude different portions of the item than other input images 104, include or exclude one or more other objects or background elements than other input images 104, and so forth.

The cross-attention module 116 may determine a fifth (e.g., final) latent representation 102(5) based on the cross-attention operation, the weight parameter, the fifth image representation 112(5), and the fourth latent representation 102(4). For example the fifth image representation 112(5), or in some cases the output of an image encoding backbone based on the fifth image representation 112(5), may be used as the keys and values for the cross-attention operation, while the fourth latent representation 102(4) is used as the queries of the cross-attention operation. In some implementations, the weight parameter may control the weights associated with the fifth image representation 112(5) and the fourth latent representation 102(4) when performing the cross-attention operation. The cross-attention operation may cause features that are common to multiple image representations 112 to be weighted more heavily than features that are not common to multiple image representations 112.

The fifth (e.g., final) latent representation 102(5) may be provided to one or more search/index servers 118 or other computing devices or network-accessible storage devices, such as for use with subsequent search operations, indexing operations, and so forth. For example, a search query may include an image, which may be encoded to determine a representation. The representation of the search query image may be compared with the latent representation 102(5) to determine an output. For example, correspondence between the latent representation 102(5) and a representation of a search query image may indicate that the item represented by the latent representation 102(5) corresponds to the item indicated in the search query image. While FIGS. 1A and 1B depict an example set of input images 104 that includes five images, in other implementations, a set of images provided to the image processing server(s) 106 may include any number of images, including more than five images or fewer than five images. Additionally, while FIG. 1B depicts the search/index server(s) 118 as one or more computing devices that are separate from the image processing server(s) 106, in other implementation, the same computing device or set of computing devices may perform one or more of the functions described with regard to the image processing server(s) 106 and the search/index server(s) 118.

Figure 2:
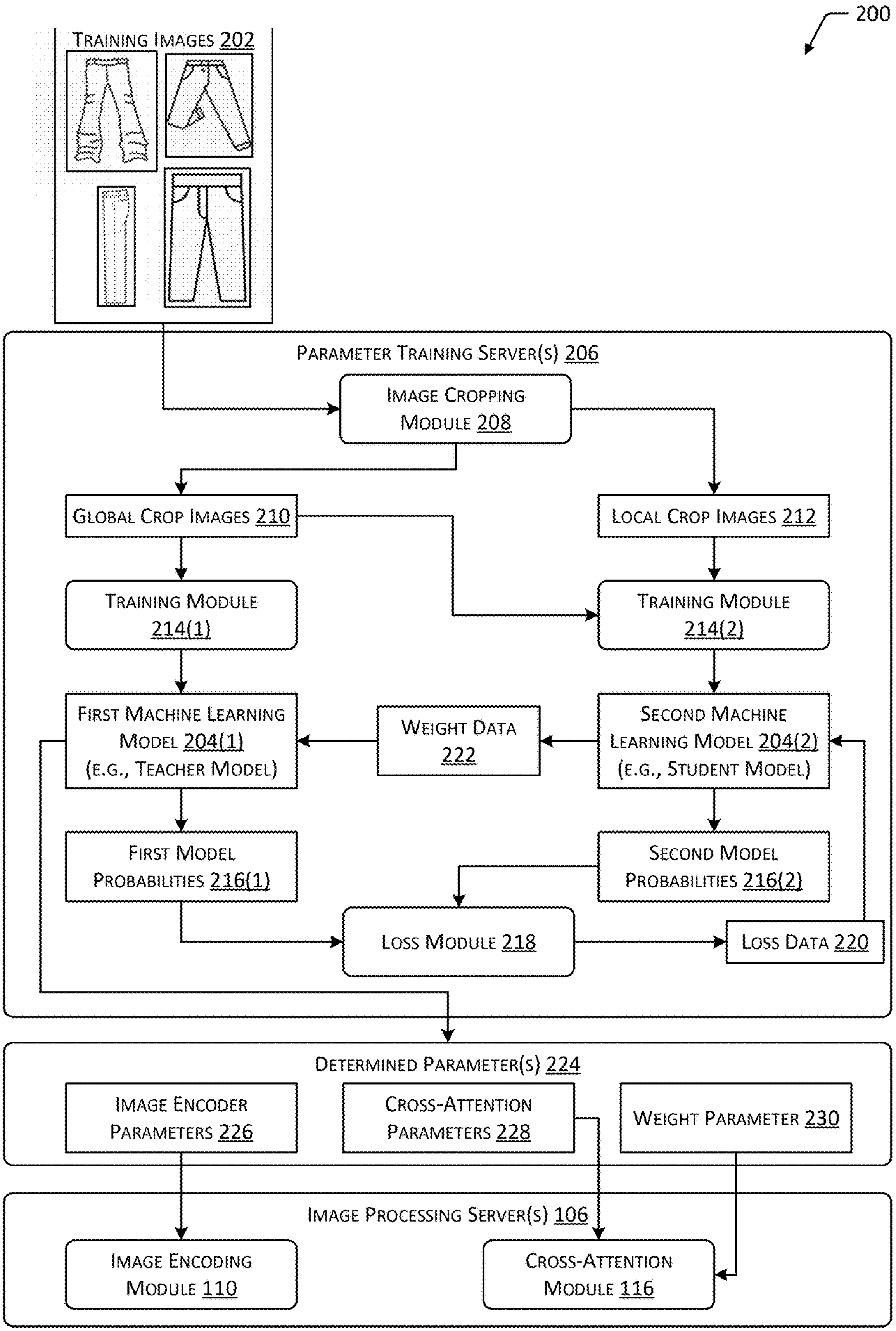
FIG. 2 is a diagram depicting an implementation of a system for determining parameters for an image encoder and cross-attention operation by providing cropped training images to two machine learning models.

FIG. 2 is a diagram 200 depicting an implementation of a system for determining parameters for an image encoder and cross-attention operation by providing cropped training images 202 to two machine learning models 204. The training images 202 may include image data representing images that depict an object in various locations, used for various purposes, various views of the object, and so forth. Each training image 202 may depict at least a portion of the object, however in some cases, one or more portions of the object may not be visible in a particular training image 202, and in some cases, one or more background elements or other objects may be included in a training image 202. The training images 202 may be provided to one or more parameter training servers 206. While FIG. 2 depicts the parameter training server(s) 206 as a server, in other implementations, the parameter training server(s) 206 may include any number and any type of computing devices including, without limitation, the types of computing devices described with regard to the image processing server(s) 106. Additionally, while FIGS. 1A, 1B, and 2 depict the image processing server(s) 106 and parameter training server(s) 206 as separate computing devices, in some implementations, the same computing device or set of computing devices may perform one or more of the functions described with regard to the image processing server(s) 106 and the parameter training server(s) 206. Furthermore, while FIG. 2 depicts the training images 202 being provided to the parameter training server(s) 206, such as by a separate computing device, in other implementations, the training images 202 may be acquired or generated using the parameter training server(s) 206, or a combination of the parameter training server(s) 206 and one or more other computing devices may be used to acquire the training images 202.

An image cropping module 208 associated with the parameter training server(s) 206 may determine a first set of images—global crop images 210—and a second set of images—local crop images 212—based on the training images 202. Each global crop image 210 may have one or more dimensions larger than a corresponding dimension of a local crop image 212. In some implementations, the global crop images 210 and local crop images 212 may be generated by randomly performing cropping operations based on the training images 202. In other implementations, the global crop images 210 and local crop images 212 may be generated based on a selected set of rules or configurations.

A first training module 214(1) associated with the parameter training server(s) 206 may provide the global crop images 210 to a first machine learning model 204(1) as training data. In some implementations, the global crop images 210 may be encoded or otherwise modified or processed for use with the first machine learning model 204(1). Based on the current weights, parameters, or other values associated with the first machine learning model 204(1), the first machine learning model 204(1) may determine first model probabilities 216(1) based on the global crop images 210.

A second training module 214(2) associated with the parameter training server(s) 206 may provide the global crop images 210 and the local crop images 212 to a second machine learning model 204(2) as training data. In some implementations, the global crop images 210 and local crop images 212 may be encoded or otherwise processed for use with the second machine learning model 204(2). While FIG. 2 depicts a first training module 214(1) and a second training module 214(2) associated with the parameter training server (s) 206, in other implementations, a single training module 214 may perform the functions described with regard to the first training module 214(1) and the second training module 214(2). Based on the current weights, parameters, or other values associated with the second machine learning model 204(2), the second machine learning model 204(2) may determine second model probabilities 216(2) based on the global crop images 210 and the local crop images 212.

The first machine learning model 204(1) and second machine learning model 204(2) may function as "teacher" and "student" models, respectively, as described with regard to Equations 3-5 above. Use of two machine learning models in this context, with the first machine learning model 204(1) processing the global crop images 210 having a larger dimension and the second machine learning model 204(2) processing the global crop images 210 and the local crop images 212 having a smaller dimension may enable the models to determine local-to-global correspondences. For example, a loss module 218 associated with the parameter training server(s) 206 may determine loss data 220 that represents an output of the loss module 218, based on a difference between the first model probabilities 216(1) and the second model probabilities 216(2). In some implementations, the loss data 220 may be determined based at least in part on Equation 4 described above. The loss data 220 may be used to train the second machine learning model 204(2), such as by optimizing the weights, parameters, or other values of the second machine learning model 204(2) using a gradient backpropagation process. This optimization process may enable the second machine learning model 204(2) to approach an optimal set of weights, parameters, or other values via stochastic gradient descent.

Weight data 222 that represents the weights, parameters, or other values of the second machine learning model 204(2) may be used to train the weights, parameters, or other values of the first machine learning model 204(1). For example, as described with regard to Equation 5 above, an exponential moving average over the weights of the second machine learning model 204(2) may be used to update the weights of the first machine learning model 204(1) during the training process, following a momentum encoder ($\lambda$) based on a cosine scheduler. Use of this learning paradigm may enable the first machine learning model 204(1) to stabilize and guide the second machine learning model 204(2) toward an optimal exploration through an embedding as the training process progresses.

The training process using the fist machine learning model 204(1) and second machine learning model 204(2) may enable the trained parameters of the first machine learning model 204(1) to be used as a set of determined parameters 224 for the image encoding module 110 and cross-attention module 116. For example, the determined parameters 224 may include a set of image encoder parameters 226 that may affect the determination of image representations 112 based on input images 104. The determined parameters 224 may also include one or more cross-attention parameters 228, that may affect the determination of latent representations 102 using a cross-attention operation. The determined parameters 224 may additionally include a weight parameter 230, which may affect the weight associated with a current latent representation 102 and the weight associated with an image representation 112 when determining a subsequent latent representation 102 using the cross-attention operation.

Figure 3:
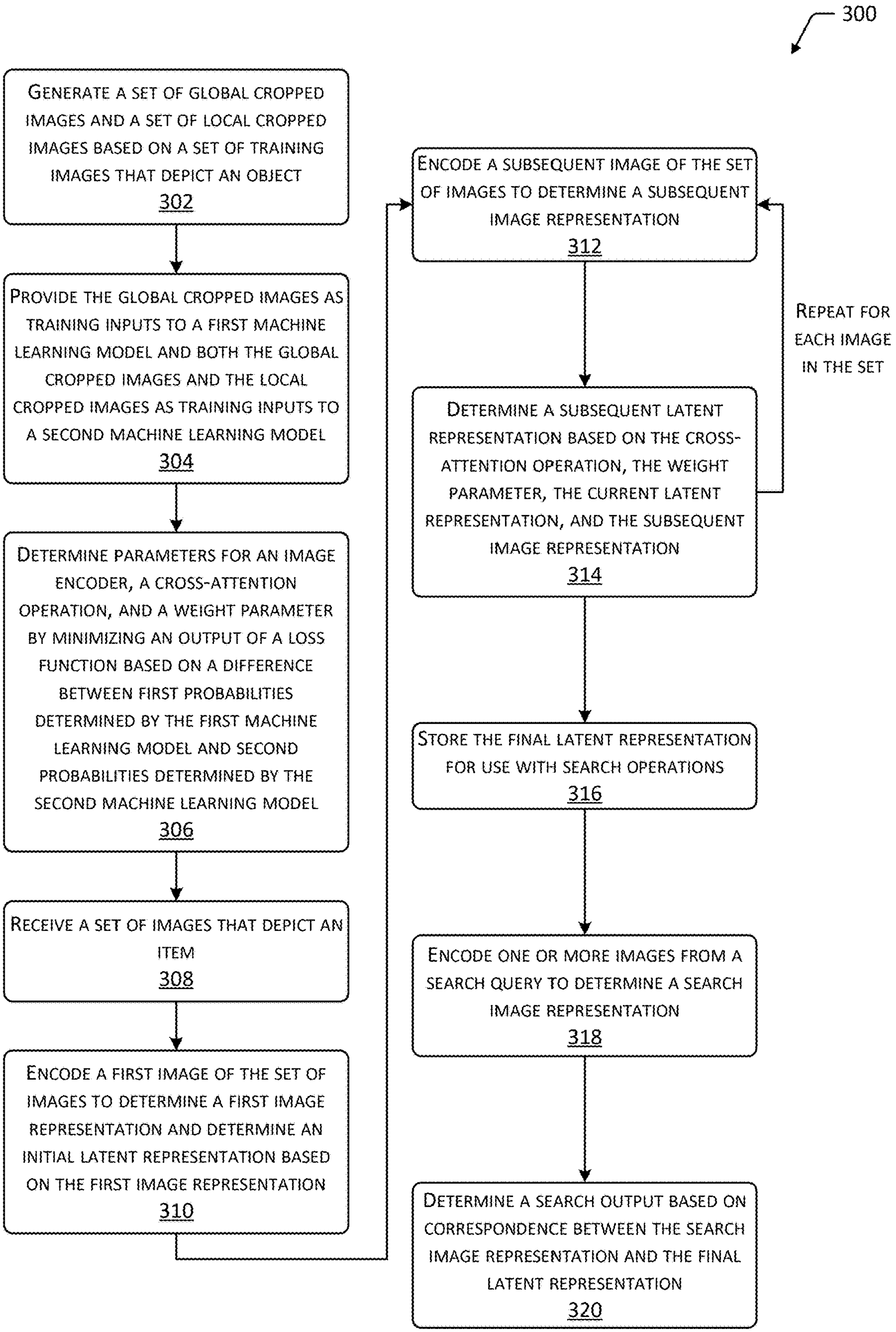
FIG. 3 is a flow diagram depicting an implementation of a method for determining parameters for a system for generating a latent representation of an item based on multiple images of the item, determining the latent representation, and using the latent representation for a search operation.

FIG. 3 is a flow diagram 300 depicting an implementation of a method for determining parameters for a system for generating a latent representation 102 of an item based on multiple images of the item, determining the latent representation 102, and using the latent representation 102 for a search operation. At 302, a set of global cropped images and a set of local cropped images may be generated based on a set of training images 202 that depict an object. As described with regard to FIG. 2, each training image 202 of a set of training images 202 may depict at least a portion of an object, but in one or more particular training image 202, one or more portions of the object may not be visible, or one or more other objects or background elements may be depicted. A set of global crop images 210 and a set of local crop images 212 may be determined based on the training images 202, the global crop images 210 each having at least one dimension larger than a corresponding dimension of a local crop image 212. In some implementations, the global crop images 210 and local crop images 212 may be generated by randomly performing cropping operations based on the training images 202. In other implementations, the global crop images 210 and local crop images 212 may be generated based on a set of rules or configurations.

At 304, the global cropped images may be provided as training inputs to a first machine learning model 204(1) and both the global cropped images and the local cropped images may be provided as training inputs to a second machine learning model 204(2). As described with regard to FIG. 2, each machine learning model may determine a set of probabilities based on the training inputs. The differences in the probabilities determined by each machine learning model and the output of a loss function may be used to determine parameters for an image encoder, cross-attention operation, and a weight parameter 230 for use with the cross-attention operation.

For example, at 306, parameters for an image encoder, a cross-attention operation, and a weight parameter 230 may be determined by minimizing an output of a loss function based on a difference between first probabilities determined by the first machine learning model 204(1) and second probabilities determined by the second machine learning model 204(2). As described previously with regard to FIG. 2, Equation 3, Equation 4, and Equation 5, the two machine learning models may function as "teacher" and "student" models, with weights of the student model being trained based on the loss function and weights of the teacher model being trained based on a moving average associated with the weights of the student model. This optimization process may enable the student model to approach an optimal set of weights, parameters, or other values via stochastic gradient descent, while the teacher model may stabilize and guide the student model toward an optimal exploration through an embedding as the training process progresses. The parameters of the teacher model may then be updated based on the modified weights of the student model. The trained parameters of the teacher model that are determined based on this training process may be used to affect the determination of image representations 112 using an image encoder and the determination of latent representations 102 using a cross-attention operation.

At 308, a set of images that depict an item may be received. For example, as described with regard to FIGS. 1A and 1B, a set of input images 104 that depict various views of an item, the item being used for various purposes, the item in various locations, and so forth may be received or accessed. Each input image 104 may depict one or more features of the item, while one or more other features of the item may be obscured in the input image 104. In some cases, an input image 104 may include one or more background elements or other objects.

At 310, a first image 108(1) of the set of images may be encoded to determine a first image representation 112(1), and an initial latent representation 102(1) may be determined based on the first image representation 112(1). As described with regard to FIG. 1A, one or more image encoders may be used to determine an image representation 112(1) based on a first image 108(1). The image representation 112(1) may include a vector embedding or other type of representation that indicates characteristics of at least a portion of the first image 108(1). For example, a vector embedding may include a series of values, with each value associated with a dimension of the embedding that corresponds to a characteristic of a portion of the first image 108(1). In some implementations, the initial latent representation 102(1) may be determined by projecting the first image representation 112(1) into a latent space having dimensions corresponding to those of the first image representation 112(1), or another selected set of dimensions. For example, as described previously, the first image representation 112(1) for the first image 108(1) may be processed using an image encoding backbone ($\varnothing^{BKB}$: $\mathbb{R}^{h\times w\times 3}\rightarrow\mathbb{R}^{d}$)

At 312, a subsequent image of the set of images may be encoded to determine a subsequent image representation 112. As described with regard to FIGS. 1A and 1B, after determining the initial latent representation 102(1), one or more image encoders may determine a vector embedding or other type of representation based on a subsequent image of the input images 104.

At 314, a subsequent latent representation 102 may be determined based on the cross-attention operation, the weight parameter, the current latent representation 102, and the subsequent image representation 112. As described with regard to FIG. 1A, FIG. 1B, Equation 1, and Equation 2, in a cross-attention operation, the subsequent image representation 112 may be used as the keys and values, while the current latent representation 102 may be used as the queries. As described with regard to Equation 1, the weight parameter may control the weight associated with the subsequent image representation 112 and the weight associated with the current latent representation 102 when performing the cross-attention operation. The subsequent latent representation 102 determined using the cross-attention operation may represent features of the item depicted in each input image 104 that has been processed as described at 312 and 314. The cross-attention operation may cause features that are common to multiple image representations 112 to be weighted more heavily, while features that are not common to the image representations 112 may be weighed less heavily. For example, features common to multiple image representations 112 have a high probability of representing characteristics of the depicted item, while features that are not common to multiple image representations 112 have a high probability of representing a background element or other object.

The steps described at 312 and 314 may be repeated for each image in a set of input images 104. For example, a subsequent input image 104 may be encoded to determine an image representation 112. The image representation 112 and current latent representation 102 may be used in conjunction with the cross-attention operation to determine a subsequent latent representation 102. A subsequent input image 104 may then be encoded and the resulting image representation 112 may be used in conjunction with the cross-attention operation and subsequent latent representation 102, to determine a further subsequent latent representation 102, and so forth. Each successive image that is used to modify the latent representation 102 may improve the accuracy of the latent representation 102 with regard to the features of the item depicted in the images.

At 316, after each input image 104 has been processed, the final latent representation 102 may be stored for use with search operations. For example, as described with regard to FIG. 1B, a final latent representation 102 may be provided to one or more search/index servers 118, or one or more other computing devices, for use with search operations or other types of operations.

At 318, one or more images from a search query may be encoded to determine a search image representation. For example, a search query or a request to perform another type of operation associated with one or more stored latent representations 102 may be received. The search query may include an image or a set of images that depict an item and may be encoded to determine a representation of characteristics of the image. For example, the image encoder used to determine image representations 112 based on input images 104 may also be used to determine a representation based on an image associated with a search query, or in other cases, one or more other image encoders may be used. In some implementations, in cases where multiple images are received in association with a search query, the process described with regard to FIGS. 1A and 1B may be used to determine a single latent representation that represents the images from the search query.

At 320, a search output may be determined based on correspondence between the search image representation and the final latent representation 102. For example, the representation of the search image(s) may be compared to one or more latent representations 102, each latent representation 102 representing characteristics of an item depicted in an associated set of input images 104 from which the latent representation 102 was determined. Correspondence between the representation of the search image(s) and a particular latent representation 102 may indicate that the item represented by the latent representation 102 has one or more visual characteristics that are similar to those of the image(s) included in the search query. For example, the search output generated based on the correspondence may include one or more search results, each search result indicating an item associated with a latent representation 102 that is similar to the search image representation within at least a threshold similarity.

Figure 4:
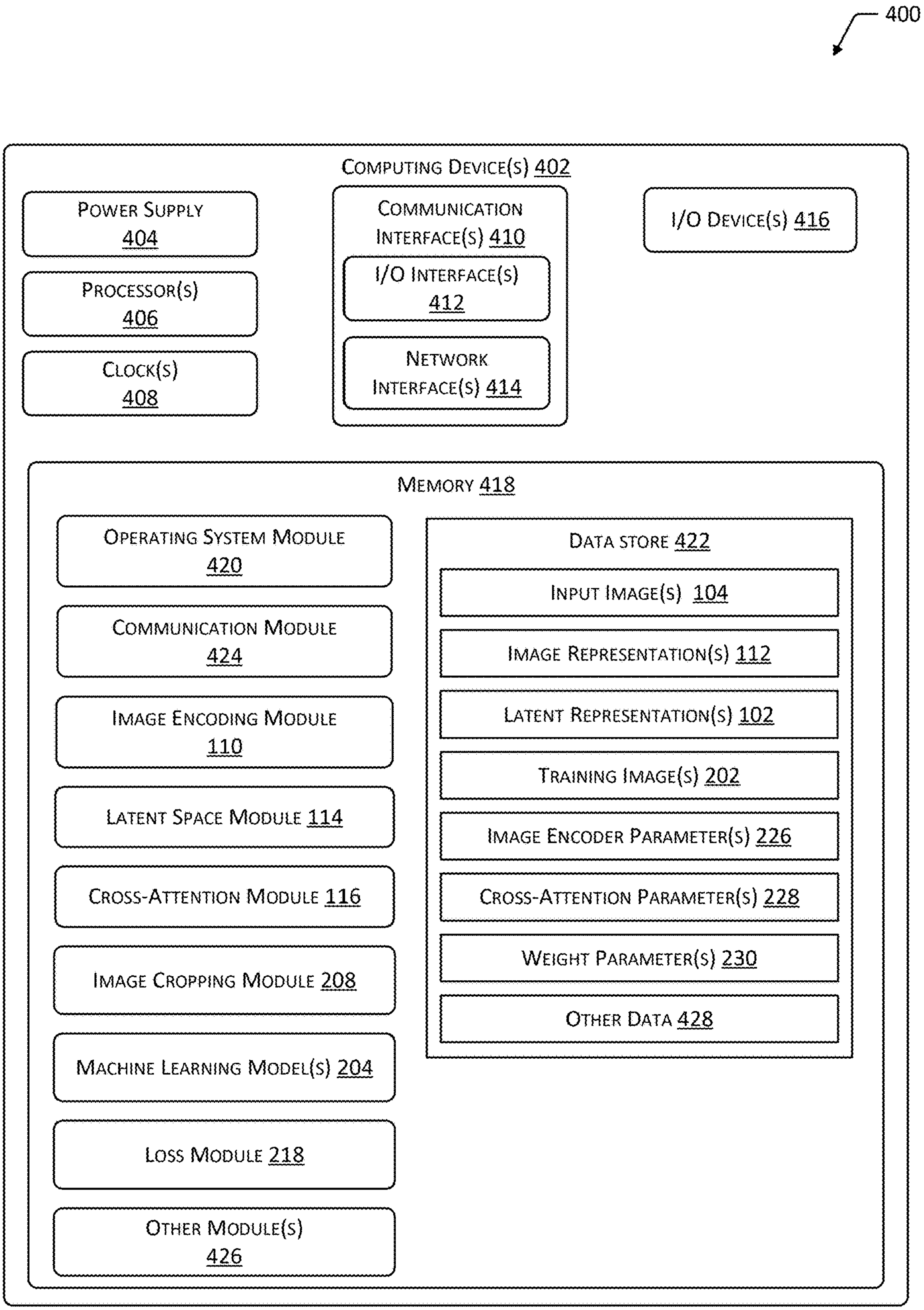
FIG. 4 is a block diagram depicting an implementation of a computing device within the present disclosure.

FIG. 4 is a block diagram 400 depicting an implementation of a computing device 402 within the present disclosure. The computing device 402 may include one or more image processing servers 106, as described with regard to FIGS. 1A and 1B. The computing device 402 may also include one or more search/index servers 118, one or more parameter training servers 206, or one or more other computing devices in communication with an image processing server 106, search/index server 118, or parameter training server 206. Thus, while FIG. 4 depicts a single block diagram 400, the computing device 402 may include any number and any type of computing devices including, without limitation, one or more servers, personal computing devices, portable computing devices, network-accessible data storage devices, and so forth, any combination of which may perform one or more functions described with regard to the image processing server(s) 106, search/index server(s) 118, or parameter training server(s) 206.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (12C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may store the image encoding module 110. The image encoding module 110 may determine image representations 112, such as vector embeddings or other type of representations, based on images. The images may include training images 202 for training machine learning models 204, input images 104 that depict an item for generation of latent representations 102 of features of the item, search query images that represent characteristics of an image included in a search query, and so forth.

The memory 418 may also store the latent space module 114. The latent space module 114 may determine an initial latent representation 102(1) based on the first image representation 112(1) that represents a first input image 104. For example, the latent space module 114 may project the first image representation 112(1) into a latent space having dimensions corresponding to those of the first image representation 112(1), or another selected set of dimensions. For example, an image representation 112 may be processed using an image encoding backbone ($\o^{BKB}$: $R^{h \times w \times 3} \rightarrow R^{d}$)

The memory 418 may additionally store the cross-attention module 116. The cross-attention module 116 may perform a cross-attention operation based on a latent representation 102, an image representation 112, and in some implementations a weight parameter. For example, as described with regard to Equation 1 and Equation 2, an image representation 112, or in some cases the output of an image encoding backbone based on the image representation 112, may be used as the keys and values for the cross-attention operation, while the latent representation 102 is used as the queries of the cross-attention operation. In some implementations, as described with regard to Equation 1, the weight parameter may control the weight associated with the image representation 112 and the weight associated with the latent representation 102 when performing the cross-attention operation.

The memory 418 may store the image cropping module 208. The image cropping module 208 may determine sets of cropped images, such as global crop images 210 and local crop images 212 based on training images 202. Each global crop image 210 may have one or more dimensions larger than a corresponding dimension of a local crop image 212. In some implementations, the global crop images 210 and local crop images 212 may be generated by randomly performing cropping operations based on training images 202. In other implementations, the global crop images 210 and local crop images 212 may be generated based on a set of rules or configurations.

The memory 418 may also store one or more machine learning models 204. The machine learning models 204 may determine probabilities based on images generated using the image cropping module 208. For example, a first machine learning model 204(1) may be provided with training data based on the global crop images 210 and may determine first model probabilities 216(1), while a second machine learning model 204(2) is provided with global crop images 210 and local crop images 212 and may determine second model probabilities 216(2). Differences in probabilities determined by each machine learning model 204 may be used to modify the weights associated with each machine learning model 204, and the process of optimization of the weights for the machine learning models 204 may be used to determine parameters for the image encoding module 110 and cross-attention module 116.

The memory 418 may additionally store the loss module 218. The loss module 218 may determine loss data 220 that represents an output of the loss module 218, based on a difference between first model probabilities 216(1) determined using the first machine learning model 204(1) and second model probabilities 216(2). The loss data 220 may be used to train the second machine learning model 204(2), such as by optimizing the weights, parameters, or other values of the second machine learning model 204(2) using a gradient backpropagation process. This optimization process may enable the second machine learning model 204(2) to approach an optimal set of weights, parameters, or other values via stochastic gradient descent. Weight data 222 that represents the weights, parameters, or other values of the second machine learning model 204(2) may be used to train the weights, parameters, or other values of the first machine learning model 204(1). For example, as described with regard to Equation 5, an exponential moving average over the weights of the second machine learning model 204(2) may be used to update the weights of the first machine learning model 204(1) during the training process, following a momentum encoder (λ) based on a cosine scheduler. Use of this learning paradigm may enable the first machine learning model 204(1) to stabilize and guide the second machine learning model 204(2) toward an optimal exploration through an embedding as the training process progresses.

Other modules 426 may also be present in the memory 418. For example, other modules 426 may include permission or authorization modules for modifying data associated with the computing device 402. Other modules 426 may also include encryption modules to encrypt and decrypt communications between computing devices 402, authentication modules to authenticate communications sent or received by computing devices 402, and so forth. Other modules 426 may also include modules for analyzing or processing text data, image data, video data, and so forth. Other modules 426 may include user interface modules for receiving user input, such as input images 104, training images 202, search queries, and so forth, and providing output. Other modules 426 may also include text recognition and object recognition modules.

Other data 428 within the data store(s) 422 may include configurations, settings, preferences, and default or threshold values associated with computing devices 402, style or layout data for generation of interfaces, and so forth. Other data 428 may include training data and contextual data for use with machine learning models 204. Other data 428 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more non-transitory memories storing computer-executable instructions; and one or more hardware processors to execute the computer-executable instructions to:

receive a first plurality of images that depict a first item;

encode a first image of the first plurality of images using an image encoder to determine a first image representation;

determine a first latent representation based on the first image representation;

encode a second image of the first plurality of images using the image encoder to determine a second image representation; and determine a second latent representation based on the first latent representation, the second image representation, a cross-attention operation, and a weight parameter, wherein:

the weight parameter associates a first weight with the first latent representation and a second weight with the second image representation, and the cross-attention operation associates a third weight with a first portion of the second image representation associated with a first characteristic common to the first image and the second image, and a fourth weight less than the third weight with a second portion of the second image representation.

2. The system of claim 1, further comprising computer-executable instructions to:

receive a search query associated with a second plurality of images that depict the first item;

encode a third image of the second plurality of images to determine a third image representation;

determine a third latent representation based on the third image representation;

encode a fourth image of the second plurality of images to determine a fourth image representation;

determine a fourth latent representation based on the third latent representation, the fourth image representation, the cross-attention operation, and the weight parameter;

determine correspondence between the fourth latent representation and the second latent representation; and determine output based on the correspondence between the fourth latent representation and the second latent representation.

3. The system of claim 1, wherein the image encoder, the cross-attention operation, and the weight parameter are associated with a first machine learning model, the system further comprising computer-executable instructions to:

receive a second plurality of images that depict a second item having one or more characteristics of the first item;

determine a third plurality of images by cropping the second plurality of images to provide the third plurality of images with a first dimension;

determine a fourth plurality of images by cropping the second plurality of images to provide the fourth plurality of images with a second dimension less than the first dimension;

provide the third plurality of images as training data to a second machine learning model, wherein the second machine learning model determines a first set of probabilities based on the third plurality of images;

provide the third plurality of images and the fourth plurality of images to a third machine learning model, wherein the third machine learning model determines a second set of probabilities based on the third plurality of images and the fourth plurality of images; and determine a first set of parameters for the image encoder, a second set of parameters for the cross-attention operation, and the weight parameter by minimizing an output of a loss function based on a difference between the first set of probabilities and the second set of probabilities.

4. A system comprising:

one or more non-transitory memories storing computer-executable instructions; and one or more hardware processors to execute the computer-executable instructions to:

encode first image data that represents a first image of a first item to determine a first image representation;

determine a first latent representation based on the first image representation;

encode second image data that represents a second image of the first item to determine a second image representation; and determine a second latent representation based on the first latent representation, the second image representation, and a cross-attention operation, wherein the second latent representation represents at least one first characteristic of the first image data and at least one second characteristic of the second image data.

5. The system of claim 4, wherein the cross-attention operation associates a first weight with a first portion of the second image representation associated with a first characteristic common to the first image data and the second image data, and a second weight less than the first weight with a second portion of the second image representation.

6. The system of claim 4, further comprising computer-executable instructions to:

receive a first plurality of images that depict a second item having one or more characteristics in common with the first item;

determine a second plurality of images by cropping the first plurality of images to provide the second plurality of images with a first dimension;

determine a third plurality of images by cropping the first plurality of images to provide the third plurality of images with a second dimension less than the first dimension;

provide the second plurality of images as training data to a first machine learning model, wherein the first machine learning model determines a first set of probabilities based on the second plurality of images;

provide the second plurality of images and the third plurality of images to a second machine learning model, wherein the second machine learning model determines a second set of probabilities based on the second plurality of images and the third plurality of images; and determine, based on a loss function associated with the first set of probabilities and the second set of probabilities:

a first set of parameters for an image encoder that encodes the first image data and the second image data, and a second set of parameters for the cross-attention operation.

7. The system of claim 6, further comprising computer-executable instructions to:

determine a third set of parameters associated with the second machine learning model by minimizing an output of the loss function based on a difference between the first set of probabilities and the second set of probabilities; and determine a fourth set of parameters associated with the first machine learning model based on the third set of parameters;

wherein the first set of parameters and the second set of parameters are determined based on the fourth set of parameters.

8. The system of claim 4, wherein the second latent representation is further determined based on a weight parameter that associates a first weight with the first latent representation and a second weight that differs from the first weight with the second image representation.

9. The system of claim 8, further comprising computer-executable instructions to:

receive a first plurality of images that depict a second item having one or more characteristics in common with the first item;

determine a second plurality of images by cropping the first plurality of images to provide the second plurality of images with a first dimension;

determine a third plurality of images by cropping the first plurality of images to provide the third plurality of images with a second dimension less than the first dimension;

provide the second plurality of images as training data to a first machine learning model, wherein the first machine learning model determines a first set of probabilities based on the second plurality of images;

provide the second plurality of images and the third plurality of images to a second machine learning model, wherein the second machine learning model determines a second set of probabilities based on the second plurality of images and the third plurality of images; and determine, based on a loss function associated with the first set of probabilities and the second set of probabilities:

a first set of parameters for an image encoder that encodes the first image data and the second image data, a second set of parameters for the cross-attention operation, and the weight parameter.

10. The system of claim 4, wherein the cross-attention operation determines the second latent representation based at least in part on one or more keys determined based on the second image representation, one or more queries determined based on the first latent representation, and one or more values determined based on the first latent representation.

11. The system of claim 4, further comprising computer-executable instructions to:

receive a plurality of images that depict the first item;

encode a first image of the plurality of images to determine a third image representation;

determine a third latent representation based on the third image representation;

encode a second image of the plurality of images to determine a fourth image representation;

determine a fourth latent representation based on the third latent representation, the fourth image representation, and the cross-attention operation;

determine correspondence between the fourth latent representation and the second latent representation; and determine output based on the correspondence between the fourth latent representation and the second latent representation.

12. The system of claim 4, further comprising computer-executable instructions to:

encode third image data that represents the first item to determine a third image representation; and determine a third latent representation based on the second latent representation, the third image representation, and the cross-attention operation, wherein the third latent representation represents at least one third characteristic of the third image data and one or more of: the at least one first characteristic or the at least one second characteristic.

13. A method comprising:

determining a first image representation based on first image data;

determining a second image representation based on second image data;

determining a first latent representation based on the first image representation, the second image representation, and a cross-attention operation, wherein the first latent representation represents at least one first characteristic that is common to the first image data and the second image data;

determining a third image representation based on third image data; and determining output based on correspondence between one or more of the first latent representation or a second latent representation determined based on the first latent representation, and the third image representation or a third latent representation determined based on the third image representation.

14. The method of claim 13, wherein the first image representation and the second image representation are determined using one or more encoders, the method further comprising:

training a first set of parameters associated with the one or more encoders and a second set of parameters associated with the cross-attention operation by:

accessing a first plurality of images;

determining a second plurality of images by cropping the first plurality of images to provide the second plurality of images with a first dimension;

determining a third plurality of images by cropping the first plurality of images to provide the third plurality of images with a second dimension less than the first dimension;

providing the second plurality of images as training data to a first machine learning model, wherein the first machine learning model determines a first set of probabilities based on the second plurality of images;

providing the second plurality of images and the third plurality of images to a second machine learning model, wherein the second machine learning model determines a second set of probabilities based on the second plurality of images and the third plurality of images; and determining the first set of parameters and the second set of parameters based on a loss function associated with a difference between the first set of probabilities and the second set of probabilities.

15. The method of claim 13, wherein the cross-attention operation associates a first weight with a first portion of the second image representation that is associated with the at least one first characteristic common to the first image data and the second image data, and a second weight less than the first weight with a second portion of the second image representation.

16. The method of claim 13, wherein the first latent representation is further determined based on a weight parameter that associates a first weight with the first image representation and a second weight that differs from the first weight with the second image representation.

17. The method of claim 16, further comprising:

accessing a first plurality of images;

determining a second plurality of images by cropping the first plurality of images to provide the second plurality of images with a first dimension;

determining a third plurality of images by cropping the first plurality of images to provide the third plurality of images with a second dimension less than the first dimension;

providing the second plurality of images as training data to a first machine learning model, wherein the first machine learning model determines a first set of probabilities based on the second plurality of images;

providing the second plurality of images and the third plurality of images to a second machine learning model, wherein the second machine learning model determines a second set of probabilities based on the second plurality of images and the third plurality of images; and determining a first set of parameters associated with one or more encoders, a second set of parameters associated with the cross-attention operation, and the weight parameter based on a loss function associated with a difference between the first set of probabilities and the second set of probabilities.

18. The method of claim 13, further comprising:

determining a fourth image representation based on fourth image data; and determining the second latent representation based on the fourth image representation, the first latent representation, and the cross-attention operation, wherein the second latent representation represents one or more of: the at least one first characteristic or at least one second characteristic of the fourth image data.

19. The method of claim 13, further comprising:

determining a fourth latent representation based on the first image representation, wherein the first latent representation is determined based on the fourth latent representation and the second image representation.

20. The method of claim 19, wherein the cross-attention operation determines the first latent representation based at least in part on one or more keys determined based on the second image representation, one or more queries determined based on the fourth latent representation, and one or more values determined based on fourth latent representation.

* * * * *